United States Patent [19]

Choi et al.

[11] Patent Number: 5,243,010

[45] Date of Patent: Sep. 7, 1993

[54] AROMATIC POLYAMIDE CONTAINING PENDANT SILYL GROUPS

[75] Inventors: Kil-Yeong Choi; Mi Hie Yi, both of Daejeon, Rep. of Korea

[73] Assignee: Korea Research Institute of Chemical Technology, Daejeon, Rep. of Korea

[21] Appl. No.: 852,075

[22] Filed: Mar. 13, 1992

[30] Foreign Application Priority Data

Mar. 14, 1991 [KR] Rep. of Korea .................. 91-4062

[51] Int. Cl.$^5$ .............................................. C08G 69/32
[52] U.S. Cl. ................................... 528/28; 528/10;
528/33; 528/183; 528/348
[58] Field of Search ................ 528/28, 33, 10, 183, 528/348

[56] References Cited

U.S. PATENT DOCUMENTS 2,722,524 11/1955 Speck ................................. 528/28
3,637,607 1/1972 Delman et al. ................... 528/28

*Primary Examiner*—Harold D. Anderson
*Attorney, Agent, or Firm*—Cushman Darby & Cushman

[57] ABSTRACT

This invention relates to the aromatic polyamide resin of the following general formula(I) having pendant silyl groups characterized in that the said polyamide resin has excellent solubility for the films to be easily prepared by solvent casting as well as useful as coating materials, can be used at higher temperature than the reported polyamides because of the excellent heat stability, and also has excellent adhesive strength in the blend with glass fiber.

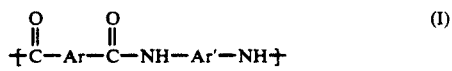

6 Claims, 4 Drawing Sheets

AROMATIC POLYAMIDE CONTAINING PENDANT SILYL GROUPS

BACKGROUND OF THE INVENTION

1. Field of the Invention

This invention relates to a novel aromatic polyamide resin having pendant silyl groups the said aromatic polyamide resin has excellent heat-resistance, mechanical strength, electric conductivity and other physical properties as well as excellent solubility in common organic solvents and improved molten processing property.

2. Description of the Related Art

Aromatic polyamide resins are generally referred to as wholly aromatic polyamides prepared from the polymerization of aromatic diamines and aromatic dicarbonyl chlorides.

Especially, they are a sort of special engineering plastic having excellent physical properties, and can be widely used in making belts such as V-belt and conveyer belt, special clothing for fire-proof, various structural materials for electric and electronic products, sports equipments, and packing materials.

They have excellent physical properties such as heat-resistance, hardness of combustibility, resistance to chemicals, and mechanical strength, but there are some problems in plastic processing because more than 400° C. of plastic processing temperature is needed, and melting and decomposition are simultaneously occurred.

Some techniques are reported to overcome the problems of polyamide resins. For example, diamine, which has some flexible structure such as —O—, —SO$_2$—, —CH$_2$— between two benzene rings, is used (U.S. Pat. No. 3,767,756), and halogen atom as side chain substituted diamine is also used (U.S. Pat No. 3,671,542).

In addition, it is also reported that heterocyclic structures are introduced in the polymer chain [J. Poly. Sci. Part B4,267(1966)].

But, in the case of the polyamide resin prepared according to the methods hereinbefore, the molten processing property is somewhat enhanced, but heat-resistance and mechanical strength are remarkably reduced.

General methods for preparing polyamide resin include solution polymerization, interfacial polymeriaztion, and direct polymerization. In the method of solution polymerization, dicarboxylic acid is converted to acid chloride and then the said acid chloride is reacted with diamine in solution in the presence of catalyst selected from pyridine, triethylamine, calcium chloride or calcium hydroxide.

The reaction solvent in this case includes amides such as dimethylacetamide (hereinafter denoted as "DMAc"), N-methylpyrrolidinone (hereinafter denoted as "NMP"), hexamethylphosphoric triamide (hereinafter denoted as "HMPA"), and tetramethylurea (hereinafter denoted as "TMU"), but dimethylformamide(DMF) and dimethylsulfoxide can not be used because they react with acyl chloride (U.S. Pat. Nos. 3,287,324, 3,094,511, and 3,354,123).

In the method of interfacial polymerization, acid chloride is dissolved in a solvent such as dichloromethane which is not miscible with water, and polymerized by adding the above acid chloride solution to the aqueous aromatic diamine solution.

In this case, phase transfer catalyst such as trimethylbenzylammononium chloride or base catalyst such as pyridine can be used, if desired.

The aromatic polyamide prepared by interfacial polymerization can be obtained as high molecular weight, but it is not appropriate in preparing fiber or films because of rather higher distribution of molecular weight than in the case of solution polymerization, and moreover reproducibility in experimental results is not sufficient.

Recently, a technique called yamazaki polyphosphorylation is reported for preparing aromatic polyamide easily in the laboratory by direct polymerization.

In the method of said yamazaki polyphosphorylation, aromatic dicarboxylic acid and diamine are directly polymerized using triphenylphosphite and pyridine as condensation catalysts, in NMP, the same solvent as in the case of solution polymerization, and this method is estimated as a considerably improved one compared with the previously developed ones.

In recent times, researches are actively progressed to improve the processing property of aromatic polyamide, for example, polymer having functional group such as carboxyl group, which is similar to ionic polymer(ionomer), is polymerzed using metal ion, and representative example of it is "surlyn" developed by DuPont, U.S.A. Both this method of polymerization is restricted mainly to the method of improving adhesive property of polyolefinic resins.

N. D. Ghatage et al. describe a method to maintain the thermal stability and increase the solubility of polymer by introducing aromatic silane moiety inside the aramid. But, most of the polyamide prepared like this exhibited poor result in solubility.

In another research field, aramid is prepared by connecting pendant group such as phenyl, phenoxy, phenylthio, or phenylcarbamoly group to the silylated polyamide backbone, and in this case the said aramid is known to have more than 200° C. of high glass transition temperature(Tg) and excellent solubility.

We inventors designed to exploit the above mentioned direct polymerization in preparing novel aromatic polyamides, and completed this invention by introducing pendant silyl group to the molecular chain of known aromatic polyamides in order for the polymers to have excellent thermal and mechanical property as well as excellent molten processing property and solubility in solvents.

SUMMARY OF THE INVENTION

The object of the present invention is to provide novel aromatic polyamides, characterized in that the said polyamides have as good physical properties as the reported resins, and also have more improved heat-resistance, solubility in solvents, molten processing property, by introducing pendant sily group to the polymer side chain, in order to overcome the problems of the reported aromatic polyamides.

This invention relates to novel aromatic polyamide resin of the following formula(I).

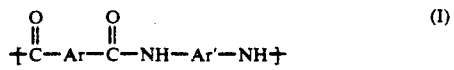

wherein,

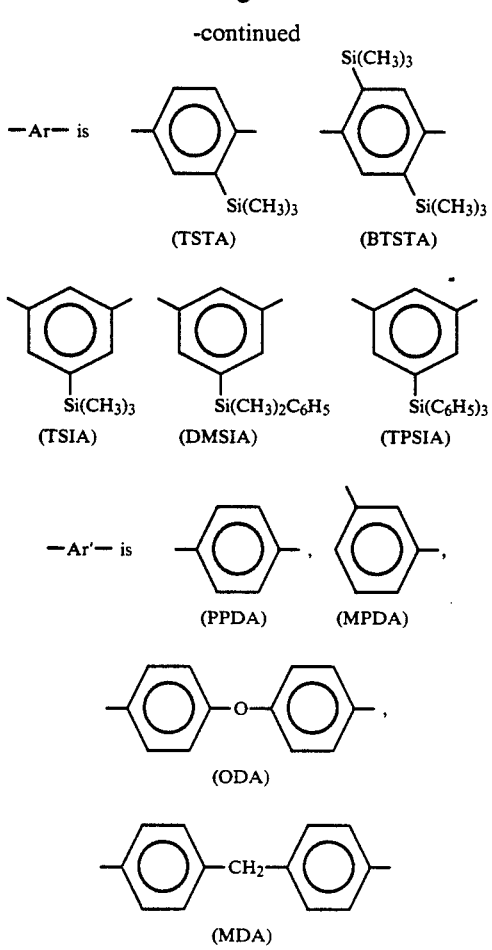

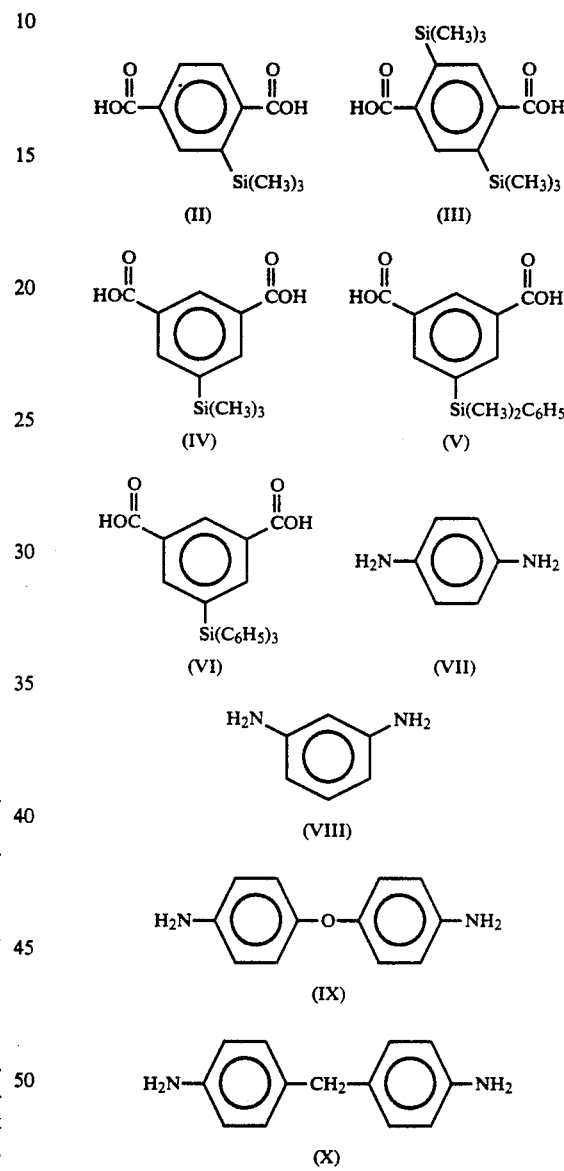

DETAILED DESCRIPTION OF THE INVENTION

Figure 1:
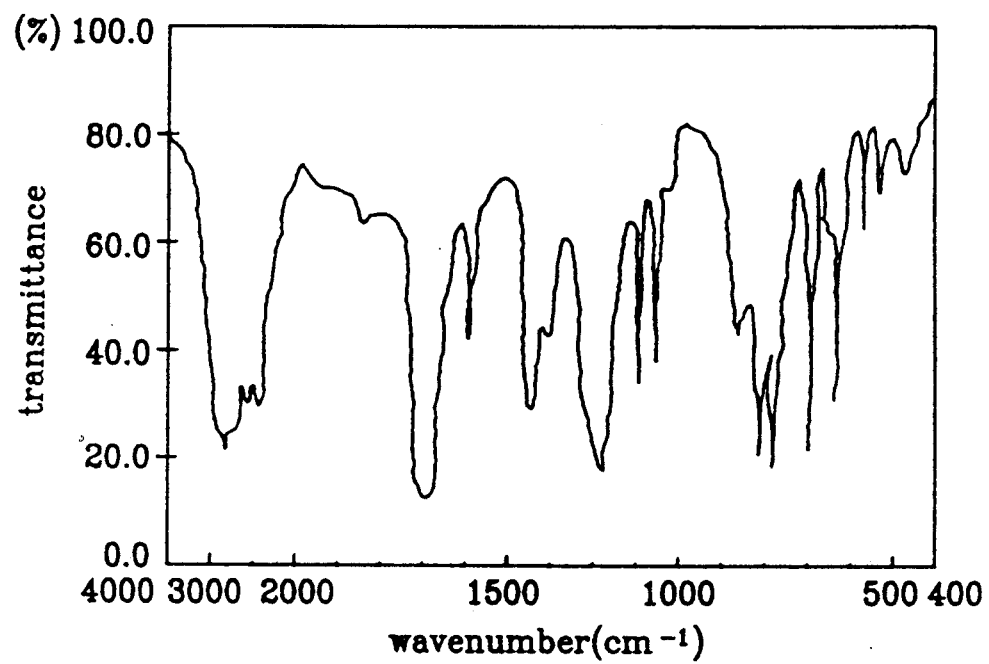
FIG. 1 is IR and ¹H-NMR spectra of 5-trimethylsilylisophthalic acid(TSIA).
Figure 1:
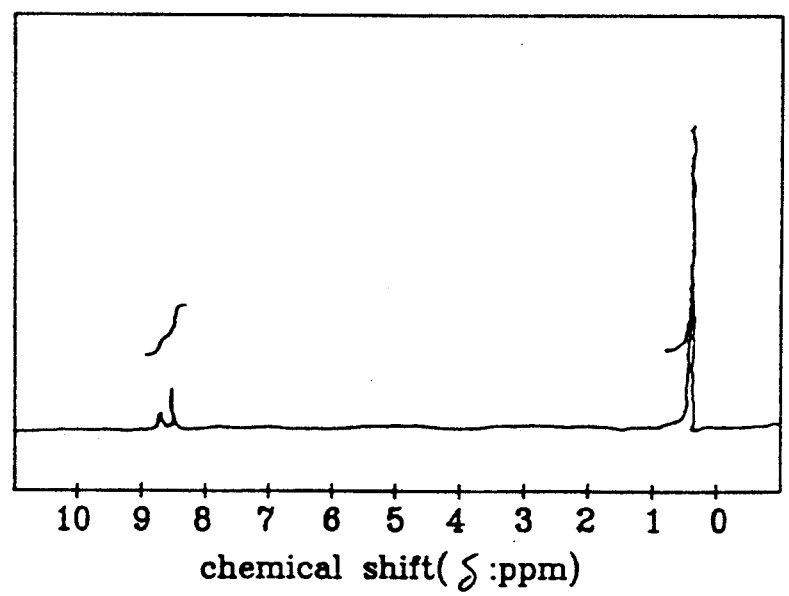
Figure 2:
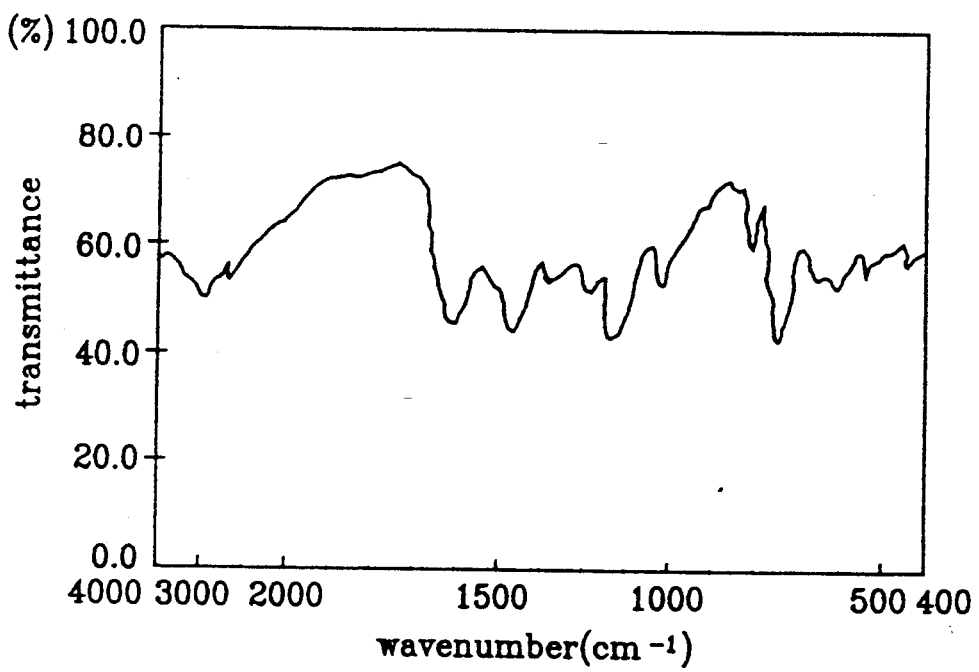
FIG. 2 is IR and ¹H-NMR spectra of P-III-C according to example 11 of this invention.
Figure 2:
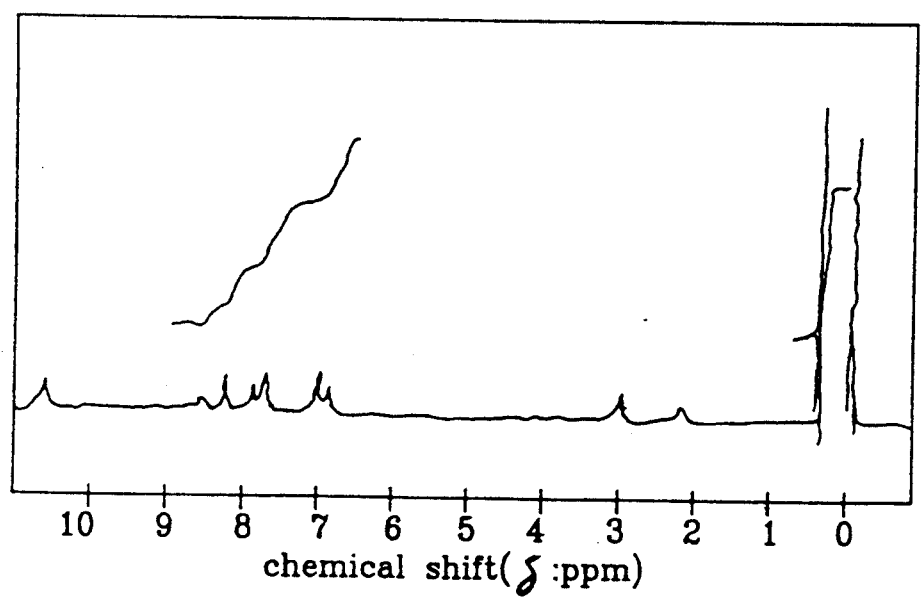
Figure 3:
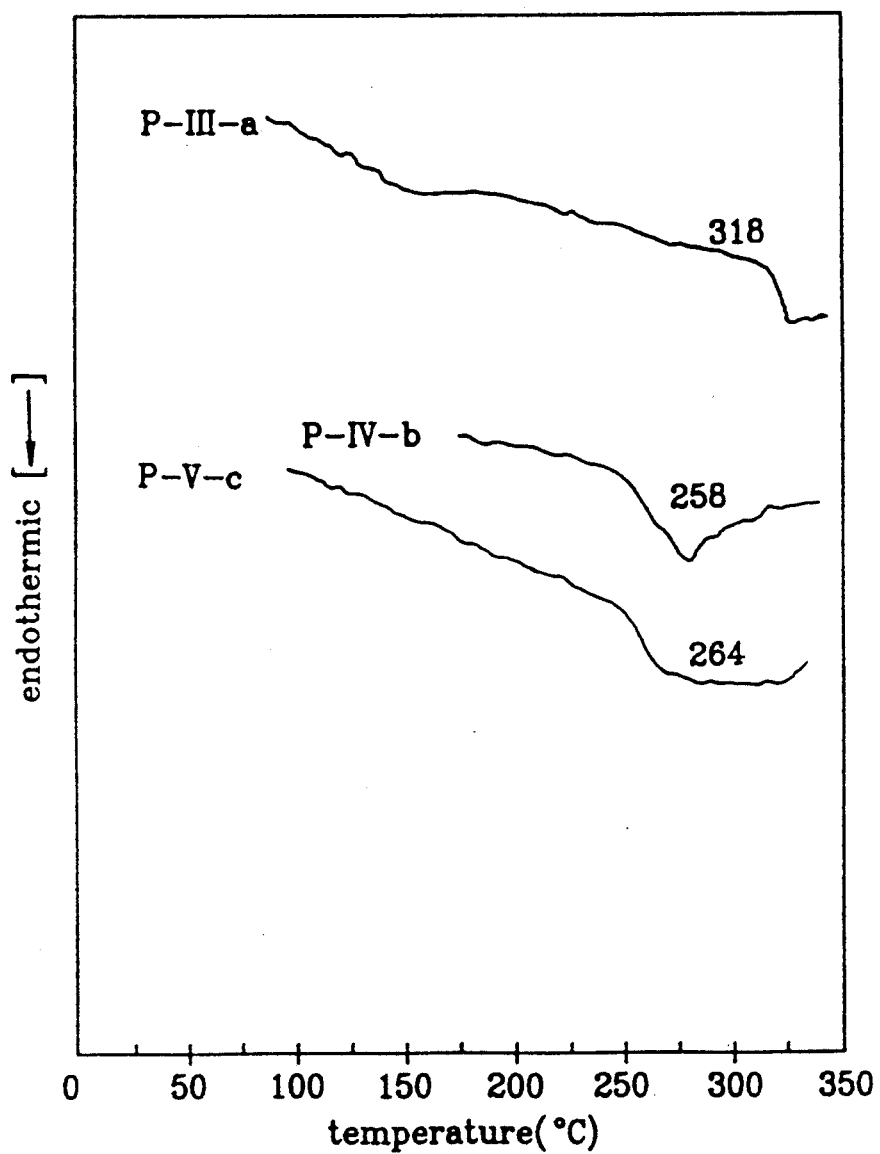
FIG. 3 is DSC curves of P-III-a, P-IV-b, and P-V-c.
Figure 4:
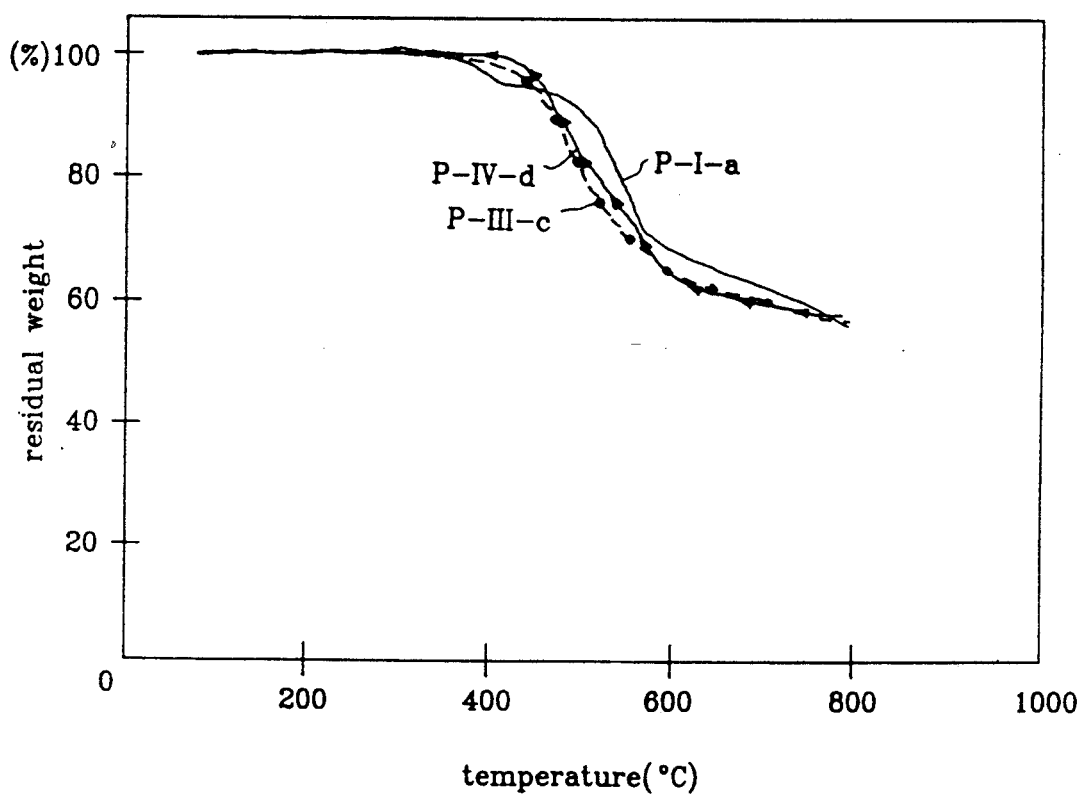
FIG. 4 is TGA curves of P-I-a, P-III-c, and P-IV-d according to the examples of this invention.

The aromatic polyamide resin or formula(I) according to this invention having pendant silyl groups exhibits 0.1~1.0 dl/g of inherent viscosity, 10% of weight loss at 358°~500° C. compared to initial weight, 240°~350° C. of glass transition point, and is easily soluble in organic solvents such as dimethylformamide (hereinafter denoted as "DMF"), or NMP.

The aromatic dicarboxylic acid, i.e., acid monomer which is used in the preparation of novel aromatic polyamide according to the present invention includes the following compounds of formula(II) to formula(VI), i.e., 2-trimethylsilylterephthalic acid(II) [hereinafter denoted as "TSTA"], 2,2'-bistrimethylsilylterephthalic acid(III) [hereinafter denoted as "BTSTA"], 5-trimethylsilylisophthalic acid(IV) [hereinafter denoted as "TSIA"], 5-dimethylphenylsilylisophthalic acid(V) [hereinafter denoted as "DMSIA"], and 5-triphenylsilylisophthalic acid(VI) [hereinafter denoted as "TPSIA"].

The said acid monomers are polymerized by direct condensation with aromatic diamine of formula(VII) to formula(X), i.e., paraphenylenediamine(VII) [hereinafter denoted as "PPDA"], metaphenylenediamine(VIII) [hereinafter denoted as "MPDA"]. oxydianiline(IX) [hereinafter denoted as "ODA"], and methylenedianiline(X) [hereinafter denoted as "MDA"], then novel aromatic polyamide resin is prepared.

The direct condensation polymerization is carried out at 100°~120° C. with stirring, desirably at 100°~110° C.

The aromatic dicarboxylic acids having pendant silyl group, i.e., TSTA, BTSTA, TSIA, DMSIA, and TPSIA which are used as acid monomers, are prepared through three steps as depicted in reaction scheme(A), and the detailed processes are explained in the following.

At first, halogen-metal interchange reaction is carried out by reacting halogenated xylene with n-butyllithium to afford lithio-xylene intermediate, and the resulting intermediate is reacted with alkylsilylchloride to afford silylated xylene of formula(A1). Silylated xylene derivative obtained above is oxidized in aqueous potassium permanganate-pyridine solution, then aromatic dicarboxylic acids such as TSTA, BTSTA, TSIA, DMSIA, and TPSIA are obtained.

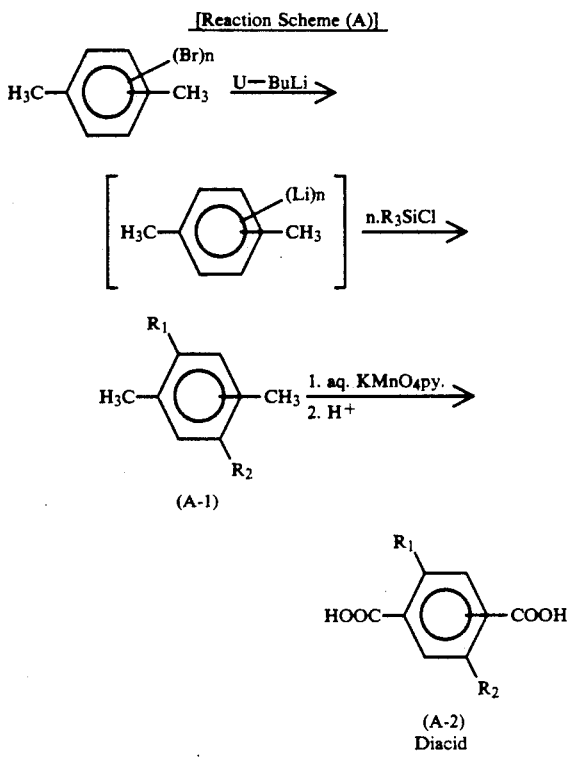

wherein, $R_1$ is $-Si(CH_3)_3$ and $R_2$ is H, papa-diacid [TSTA]; or
$R_1$ and $R_2$ are $-Si(CH_3)_3$, para-diacid [BTSTA]; or
$R_1$ is $-Si(CH_3)_3$ and $R_2$ is H, meta-diacid [TSIA]; or
$R_1$ is $-Si(CH_3)_2C_6H_5$ and $R_2$ is H, meta-diacid [DMSIA]; or
$R_1$ is $-Si(C_6H_5)_3$ and $R_2$ is H, meta-diacid [TPSIA].

In more detailed manner, 2-bromo-p-xylene(or 5bromo-m-xylene) is reacted with n-butyllithium for 5 hr at 0° C., then alkyl or arylsilylchloride is slowly added thereto, followed by further reaction for 24 hr to afford silylated xylene of formula(A-1).

Aromatic dicarboxylic acid of formula(A-2) is obtained by oxidizing silylated xylene in the presence of potassium permanganate and pyridine at reflux temperature.

The aromatic polyamide resins prepared from the monomers having pendant silyl groups according to the present invention exhibit excellent solubility compared with the reported ones prepared from terephthalic acid (hereinafter denoted as "TPA"), or isophthalic acid (hereinafter denoted as "IPA"), which are only soluble in strong acid such as sulfuric acid, not in common organic solvents.

The films from the polymers of this invention can be easily prepared by solvent casting, and they are also useful as coating agents.

Also, the aromatic polymide resins prepared according to the present invention exhibit excellent heat-stability, especially, in the case of monomers such as TSIA, DMSIA, and TPSIA having pendant silyl group at meta-position, exhibit more higher Tg than the unsubstituted aromatic polyamides of similar structure because of the introduction of bulky group at the spacially stabilized position, suggesting the possibility of using at higher temperature than the reported aromatic polyamides.

Besides, the aromatic polyamide resins of the present invention exhibit excellent electric property, hardness of combustibility, and adhesive strength in the blend with glass fiber.

The following examples illustrate this invention in more detail.

PREPARATION 1

2-Trimethylsilyl-p-xylene ("TSTX")

To a stirred solution of 1.0M of 2-bromo-p-xylene in diethyl ether at 0° C. was added n-butyllithium hexane solution solwly, and the mixture was stirrd for 5 hr. To the above reaction mixture was added 1.0M of chlorotrimethylsilane as dropwise and it was stirred for 24 hr. The solvent was removed under reduced pressure, and the residne was redistilled in vacuo to afford titled compound(TSTX) in colorloss state. The structure of product was identified by infrared and nuclear magnetic resonance spectrum, and the result is summarized in Table 1.

PREPARATION 2

2,2'-Bistrimethylsilyl-p-xylene ("BTSTX")

In the same manner as described in preparation 1, 2,5-dibromo-p-xylene was allowed to react with chlorotrimethylsilane, and afforded BTSTX. The yield and properties of product are summarized Table 1.

PREPARATION 3

5-Trimethylsilyl-m-xylene ("TSIX")

In the same manner as described in preparation 1, 5-bromo-m-xylene was allowed to react with chlorotrimethylsilane, and afforded TSIX. The yield and properties of product are summarized in Table 1.

PREPARATION 4

5-Dimethylphenylsilyl-m-xylene ("DMSIX")

In the same manner as described in preparation 1, 5-bromo-m-xylene was allowed to react with chlorodimethylphenylsilane, and afforded DMSIX. The yield and properties of product are summarized in Table 1.

PREPARATION 5

5-Tripenylsilyl-m-xylene ("TPSIX")

In the same manner as described in preparation 1, 5-bromo-m-xylene was allowed to react with chlorotriphenylsilane, and afforded TPSIX. The yield and properties are summarized in Table 1.

PREPARATION 6

Synthesis of TSTA by the oxidation of TSTX

To a reaction vessel, equipped with stirrer, thermometer, reflux condenser, and dropping funnel, were added 0.1M of TSTX, pyridine and water, and the mixture was raised to reflux temperature. The solution was reacted for 1 hr at reflux temperature, adding 0.6M of potassium permanganate solwly through dropping funnel.

Manganese dioxide and pyride were removed from the reaction mixture, the pH of the solution was adjusted to 1.0, and filtered to afford TSTA. The results are summarized in Table 1.

PREPARATION 7

In the same manner as described in preparation 6, BTSIX was oxidized to BTSTA, and the results are summarized in Table 1.

PREPARATION 8

In the same manner as described in preparation 6, TSIX was oxidized to TSIA, and the results are summarized in Table 1.

PREPARATION 9

In the same manner as described in preparation 6, DMSIX was oxidized in DMSIA, and the results are summarized in Table 1.

PREPARATION 10

In the same manner as described in preparation 6, TPSIX was oxidized in TPSIA, and the results are summarized in Table 1.

TABLE 1

| Compound | Yield (%) | melting point (°C.) | boiling point (°C./mm Hg) | IR (cm$^{-1}$) | $^1$H-NMR (δ: ppm) |
|---|---|---|---|---|---|
| TSTX | 63.4 | — | 214–215 | 830 (ν Si—CH$_3$) | 0.35 (Si—CH$_3$) |
| BTSTX | 35.0 | 53–55 | — | 820 (ν Si—CH$_3$) | 0.40 (ν Si—CH$_3$) |
| TSIX | 87.0 | — | 198–200 | 820 (ν Si—CH$_3$) | 0.30 (ν Si—CH$_3$) |
| DMSIX | — | — | — | 810 (ν Si—CH$_3$) | 6.6~7.0 (ν Si—C$_6$H$_5$) |
| TPSIX | 68.7 | *dec. | — | — | 6.7–7.3 (Si—C$_6$H$_5$) |
| TSTA | 79.8 | 276 (dec.) | — | 1690–1680 (ν C=O) 830 (ν Si—CH$_3$) | 0.45 (Si—CH$_3$) 8.0~8.5 (C$_6$H$_5$) |
| BTSTA | 74.9 | 250 (dec.) | — | 840 (ν Si—CH$_3$) | 0.4~0.5 (Si—CH$_3$) |
| TSIA | 75.7 | 315 | — | 1710–1680 ((ν C=O) 830 ((ν Si—CH$_3$) | 0.4~0.5 (Si—CH$_3$) |
| DMSIA | 73.2 | 275 | — | 1680–1700 ((ν C=O) | 0.5~0.6 (Si—CH$_3$) 7.3~7.6 (Si—C$_6$H$_5$) |
| TPSIA | 75.6 | 243 | — | 1680–1700 (ν C=O) | 7.5~7.6 (Si—C$_6$H$_5$) |

*dec. means decomposition.

EXAMPLE 1

To a 250 ml reactor, equipped with stirrer, temperature controller, nitrogen passing apparatus, dropping funnel, and cooling apparatus was added 11.9 g(0.05 mol) of TSTA, 5.4 g(0.05 mol) of PPDA and 5.0 g of lithium chloride, and admixed 31.0 g(0.1 mol) of triphenylphosphite dissolved in 25 ml of pyridine and 100 ml of NMP. Nitrogen gas was passed through the above reaction mixture, and performed direct condensation polymerization for 3 hr, adjusting the temperature of reaction mixture at 100°~110° C. using temperature controller. When the polymerization was completed, the reaction mixture was poured into 5 l of methanol for precipitation, and the resulting polymer was separated by filtration.

The polymer was washed several times with water and acetone, and dried for 12 hr at 80° C. under reduced pressure to afford a polymer(P-I-a) in a powder form.

Yield was 98.1%, and the inherent viscosity measured at 30° C. as a concentration of 0.5 g/dl in conc. sulfuric acid solution was 0.69 dl/g.

EXAMPLE 2

In the same manner as described in example 1, 11.9 g(0.05 mol) of TSTA and 5.4 g(0.05 mol) of MPDA was dissolved in same amount of lithium chloride, triphenylphosphite, pyridine and NMP as in example 1, and the resulting mixture was polymerized to afford an aromatic polyamide resin(P-I-b).

Yield was 66.7%, and the inherent viscosity measured at 30° C. as a concentration of 0.5 g/dl in conc. sulfuric acid solution was 0.18 dl/g.

EXAMPLE 3

In the same manner as described in example 1, 11.9(0.05 mol) of TSTA and 10.0 g(0.05 mol) of ODA were dissolved in same amount of lithium chloride, triphenylphosphite, pyridine and NMP as in example 1, and the resulting mixture was polymerized to afford an aromatic polyamide resin(P-I-c).

Yield was 81.3%, and the inherent viscosity measured at 30° C. as a concentration of 0.5 g/dl in conc. sulfuric acid solution was 0.80 dl/g.

EXAMPLE 4

In the same manner as described in example 1, 11.9 g(0.05 mol) of TSTA and 9.9 g(0.05 mol) of MDA were dissolved in same amount of lithium chloride, triphenylphosphite, pyridine and NMP as in example 1, and the resulting mixture was polymerized to afford an aromatic polyamide resin(P-I-d). Yield as 77.3%, and the inherent viscosity measured at 30° C. as a concentration of 0.5 g/dl in conc. sulfuric acid solution was 0.58 dl/g.

EXAMPLE 5

In the same manner as described in example 1, 15.5 g(0.05 mol) of BTSTA and 5.4 g(0.05 mol) of PPDA were dissolved in some amount of lithium chloride, triphenylphosphite, pyridine and NMP as in example 1, and the resulting mixture was polymerized to afford an aromatic polyamide resin(P-II-a). Yield was 9.16%, and the inherent viscosity measured at 30° C. as a concentration of 0.5 g/dl in conc. sulfuric acid solution was 0.83 dl/g.

EXAMPLE 6

In the same manner as described in example 1, 15.5 g(0.05 mol) of BTSTA and 5.4 g(0.05 mol) of MPDA were dissolved in same amount of lithium chloride, triphenylphosphite, pyridine and NMP as in example 1, and the resulting mixture was polymerized to afford an aromatic polyamide resin(P-II-b).

The polymer was not obtained in pure form because it couldn't be separated completely from monomer.

EXAMPLE 7

In the same manner as described in example 1, 15.5 g(0.05 mol) of BTSTA and 10.0 g(0.05 mol) of ODA dissolved in same amount of lithium chloride, triphenylphosphite, pyridine and NMP as in example 1, and the resulting mixture was polymerized to afford an aromatic polyamide resin(P-II-c). Yield was 78.1%, and the inherent viscosity measured at 30° C. as a concentration of 0.5 g/dl in conc. sulfuric acid solution was 0.53 dl/g.

EXAMPLE 8

In the same manner as described in example 1, 15.5 g(0.05 mol) of BTSTA and 9.9 g(0.05 mol) of MDA were dissolved in same amount of lithium chloride, triphenylphosphite, pyridine and NMP as in example 1, and the resulting mixture was polymerized to afford an aromatic polyamide resin(P-II-d).

Yield was 69.5%, and the inherent viscosity measured at 30° C. as a concentration of 0.5 g/dl in conc. sulfuric acid solution was 0.35 dl/g.

EXAMPLE 9

In the same manner as described in example 1, 11.9 g(0.05 mol) of TSIA and 5.4 g(0.05 mol) of PPDA were dissolved in same amount of lithium chloride, triphenylphosphite, pyridine and NMP as in example 1, and the resulting mixture was polymerized to afford an aromatic polyamide resin(P-III-a). Yield was 96.8%, and the inherent viscosity measured at 30° C. as a concentration of 0.5 g/dl in conc. sulfuric acid solution was 0.94 dl/g.

EXAMPLE 10

In the same manner as described in example 1, 11.9 g(0.05 mol) of TSIA and 5.4 g(0.05 mol) of MPDA were dissolved in same amount of lithium chloride, triphenylphosphite, pyridine and NMP as in example 1, and the resulting mixutre was polymerized to afford an aromatic polyamide resin(P-III-b).

Yield was 90.3%, and the inherent viscosity measured at 30° C. as a concentration of 0.5 g/dl in conc. sulfuric acid solution was 0.71 dl/g.

EXAMPLE 11

In the same manner as described in example 1, 11.9 g(0.05 mol) of TSIA and 10.0 g(0.05 mol) of ODA were dissolved in same amount of lithium chloride, triphenylphosphite, pyridine and NMP as in example 1, and the resulting mixture was polymerized to afford an aromatic polyamide resin (P-III-c).

Yield was 93.0%, and the inherent viscosity measured at 30° C. as a concentration of 0.5 g/dl in conc. sulfuric acid solution was 0.84 dl/g.

EXAMPLE 12

In the same manner as described in example 1, 11.9 g(0.05 mol) of TSIA and 9.9 g(0.05 mol) of MDA were dissolved in same amount of lithium chloride, triphenylphosphite, pyridine and NMP as in example 1, and the resulting mixture was polymerized to afford an aromatic polyamide resin (P-III-d). Yield was 98.3%, and the inherent viscosity measured at 30° C. as a concentration of 0.5 g/dl in conc. sulfuric acid solution was 0.78 dl/g.

EXAMPLE 13

In the same manner as described in example 1, 15.0 g(0.05 mol) of DMSIA and 5.4 g(0.05 mol) of PPDA were dissolved in same amount of lithium chloride, triphenylphosphite, pyridine and NMP, and the resulting mixture was polymerized to afford an aromatic polyamide resin(P-IV-a). Yield was 98.6%, and the inherent viscosity measured at 30° C. as a concentration of 0.5 g/dl in conc. sulfuric acid solution was 0.63 dl/g.

EXAMPLE 14

In the same manner as described in example 1, 15.0 g(0.05 mol) of DMSIA and 5.4 g(0.05 mol) of MPDA were dissolved in same amount of lithium chloride, triphenylphosphite, pyridine and NMP, and the resulting mixture was polymerized to afford an aromatic polyamide resin (P-IV-b). Yield was 93.2%, and the inherent viscosity measured at 30° C. as a concentration of 0.5 g/dl in conc. sulfuric acid solution was 0.27 dl/g.

EXAMPLE 15

In the same manner as described in example 1, 15.0 g(0.05 mol) of DMSIA and 10.0 g (0.05 mol) of ODA were dissolved in same amount of lithium chloride, triphenylphosphite, pyridine and NMP, and the resulting mixture was polymerized to afford an aromatic polyamide resin (P-IV-c). Yield was 100%, and the inherent viscosity measured at 30° C. as a concentration of 0.5 g/dl in conc. sulfuric acid solution was 0.66 dl/g.

EXAMPLE 16

In the same manner as described in example 1, 15.0 g(0.05 mol) of DMSIA and 9.9 g(0.05 mol) of MDA were dissolved in same amount of lithium chloride, triphenylphosphite, pyridine and NMP as in example 1, and the resulting mixture was polymerized to afford an aromatic polyamide resin(P-IV-d). Yield was 96.3%, and the inherent viscosity measured at 30° C. as a concentration of 0.5 g/dl in conc. sulfuric acid solution was 0.50 dl/g.

EXAMPLE 17

In the same manner as described in example 1, 21.2 g(0.05 mol) of TPSIA and 5.4 g(0.05 mol) of PPDA were dissolved in same amount of lithium chloride, triphenylphosphite, pyridine and NMP as in example 1, and the resulting mixture was polymerized to afford an aromatic polyamide resin(P-V-a). Yield was 92.7%, and the inherent viscosity measured at 30° C. as a concentration of 0.5 g/dl in conc. sulfuric acid solution was 0.31 dl/g.

EXAMPLE 18

In the same manner as described in example 1, 21.2 g(0.05 mol) of TPSIA and 5.4 g (0.05 mol) of MPDA were dissolved in same amount of lithium chloride, triphenylphosphite, pyridine and NMP, and the resulting mixture was polymerized to afford an aromatic polyamide resin(P-V-b). Yield was 79.3%, and the inherent viscosity measured at 30° C. as a concentration of 0.5 g/dl in conc. sulfuric acid solution was 0.20 dl/g.

EXAMPLE 19

In the same manner as described in example 1, 21.2 g(0.05 mol) of TPSIA and 10.0 g (0.05 mol) of ODA were dissolved in same amount of lithium chloride, triphenylphosphite, pyridine and NMP as in example 1, and the resulting mixture was polymerized to afford an aromatic polyamide resin(P-V-c). Yield was 86.2%, and the inherent viscosity measured at 30° C. as a concentration of 0.5 g/dl in conc. sulfuric acid solution was 0.24 dl/g.

EXAMPLE 20

In the same manner as described in example 1, 21.2 g(0.05 mol) of TPSIA and 9.9 g (0.05 mol) of MDA were dissolved in same amount of lithium chloride, triphenylphosphite, pyridine and NMP as in example 1, and the resulting mixture was polymerized to afford an aromatic polyamide resin(P-V-d). Yield was 86.5%, and the inherent viscosity measured at 30° C. as a concentration of 0.5 g/dl in conc. sulfuric acid solution was 0.22 dl/g.

Solubility

The following Table 2 summarizes the experimental results on solubility about the aromatic polyamide resins prepared according to the above examples.

ides was remarkably improved by introducing bulky side groups at the polymer, and the films could be prepared from the DMF solution. At the same time, the increase in solubility is expected to exert a good influence on the processing of polymer or on the expansion of its uses.

Thermal analysis of molecular weight

As can be seen in Table 3, the aromatic polyamide resins have fairly excellent thermal stability. The polymers of I, II series don't exhibit glass transition point, but those of II–V series which are substituted at meta-position exhibit glass transition temperature from 240° to 350° C.

This glass transition temperature is comparatively higher value than that of unsubstituted polyamide, which is thought to be resulted from the enhanced rigidity of the molecule owing to the introduction of bulky side chains. Temperature range of 10% weight loss in thermal weight analysis was around 358°~500° C., and the residual weight at around 700° C. was fairly

TABLE 2

| Example | Polymer | Sulfuric acid | NMP | Dimethyl sulfoxide | DMF | Pyridine | m-Cresol | THF | Chloroform |
|---|---|---|---|---|---|---|---|---|---|
| 1 | P-I-a | ○ | ○ | Δ | Δ | Δ | × | × | × |
| 2 | P-I-b | ○ | ○ | ○ | ○ | ○ | × | × | × |
| 3 | P-I-c | ○ | ○ | ○ | ○ | ○ | ○ | × | × |
| 4 | P-I-d | ○ | ○ | ○ | ○ | ○ | ○ | × | × |
| 5 | P-II-a | ○ | ○ | Δ | Δ | Δ | × | × | × |
| 6 | P-II-b | ○ | ○ | ○ | ○ | ○ | × | × | × |
| 7 | P-II-c | ○ | ○ | ○ | ○ | ○ | ○ | × | × |
| 8 | P-II-d | ○ | ○ | ○ | ○ | ○ | ○ | × | × |
| 9 | P-III-a | ○ | ○ | ○ | ○ | ○ | × | × | × |
| 10 | P-III-b | ○ | ○ | ○ | ○ | ○ | × | × | × |
| 11 | P-III-c | ○ | ○ | ○ | ○ | ○ | ○ | × | × |
| 12 | P-III-d | ○ | ○ | ○ | ○ | ○ | ○ | × | × |
| 13 | P-IV-a | ○ | ○ | ○ | Δ | Δ | × | × | × |
| 14 | P-IV-b | ○ | ○ | ○ | ○ | ○ | × | × | × |
| 15 | P-IV-c | ○ | ○ | ○ | ○ | ○ | ○ | × | × |
| 16 | P-IV-d | ○ | ○ | ○ | ○ | ○ | ○ | × | × |
| 17 | P-V-a | ○ | ○ | ○ | ○ | ○ | Δ | × | × |
| 18 | P-V-b | ○ | ○ | ○ | ○ | ○ | Δ | × | × |
| 19 | P-V-c | ○ | ○ | ○ | ○ | ○ | ○ | × | × |
| 20 | P-V-d | ○ | ○ | ○ | ○ | ○ | ○ | × | × |

*○; soluble, Δ; partially soluble, ×; insoluble

From the solubility results of the aromatic polyamides having pendant silyl groups in various solvents, the polymers prepared according to the present invention revealed excellent solubility in strongly electron-donating solvents such as NMP, DMF and dimethylsulfoxide, and were completely soluble in m-cresol or pyridine at room temperature. As a result, the solubility of polyamhigher value, i.e., 46~66% of initial weight.

The hardness of combustibility was also excellent showing more higher residual weight than that of aromatic polyamides substituted with halogen atoms.

Accordingly, it is expected that the resins can be used at elevated temperature by the improvement in heat-resistance and hardness of combustibility.

TABLE 3

| Example | Polymer | Yield (%) | Inherent (dl/g) | Glass transition temperature (°C.) | Decomposition temperature* | Residual weight at 700° C. (%) |
|---|---|---|---|---|---|---|
| 1 | P-I-a | 98.1 | 0.69 | — | 500 | 60 |
| 2 | P-I-b | 66.7 | 0.18 | — | 358 | 46 |
| 3 | P-I-c | 81.3 | 0.80 | — | 463 | 66 |
| 4 | P-I-d | 77.3 | 0.58 | — | 442 | 57 |
| 5 | P-II-a | 91.6 | 0.83 | — | 426 | 55 |
| 6 | P-II-b | — | — | — | 375 | 50 |
| 7 | P-II-c | 78.1 | 0.53 | — | 418 | 53 |
| 8 | P-II-d | 69.5 | 0.35 | — | 411 | 60 |
| 9 | P-III-a | 96.8 | 0.94 | 318 | 461 | 56 |
| 10 | P-III-b | 90.3 | 0.71 | 284 | 450 | 56 |
| 11 | P-III-c | 93.0 | 0.84 | 283 | 466 | 60 |
| 12 | P-III-d | 98.3 | 0.78 | 271 | 466 | 57 |
| 13 | P-IV-a | 98.6 | 0.63 | 287 | 450 | 58 |
| 14 | P-IV-b | 93.2 | 0.27 | 258 | 450 | 62 |
| 15 | P-IV-c | 100.0 | 0.66 | 259 | 463 | 58 |
| 16 | P-IV-d | 96.3 | 0.50 | 247 | 463 | 57 |
| 17 | P-V-a | 92.7 | 0.31 | 291 | 450 | 62 |

TABLE 3-continued

| Example | Polymer | Yield (%) | Inherent (dl/g) | Glass transition temperature (°C.) | Deocmposition temperature* | Residual weight at 700° C. (%) |
|---|---|---|---|---|---|---|
| 18 | P-V-b | 79.3 | 0.20 | 256 | 461 | 64 |
| 19 | P-V-c | 86.2 | 0.24 | 264 | 461 | 60 |
| 20 | P-V-d | 86.5 | 0.22 | 240 | 470 | 67 |

*denotes the temperature (°C.) at which 10% of initial weight is decomposed.

What is claimed is:

1. An aromatic polyamide resin having recurring units of the following general formula(I) having pendant silyl groups

wherein,

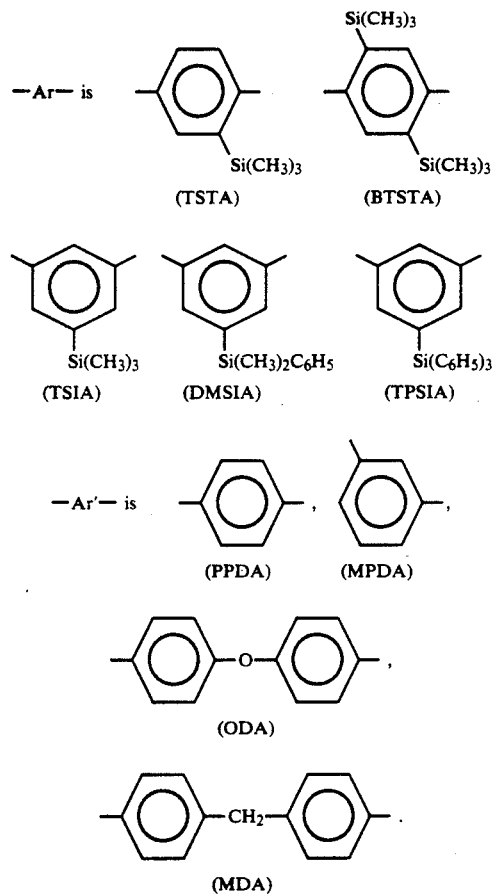

2. The polyamide resin as defined in claim 1, wherein the inherent viscosity of the polyamide resin is 0.1–1.0 dl/g, as measured at 30° C. in concentrated sulfuric acid.

3. The polyamide resin as defined in claim 1, wherein said polyamide resin exhibits 10% weight reduction of initial weight at 358°~500° C., and glass transition point at 240°~350° C.

4. The polyamide resin as defined in claim 1, wherein said polyamide resin is completely soluble in polar solvents at room temperature.

5. A process for preparing an aromatic polyamide resin of the following general formula(I), comprising, condensation polymerization of an aromatic dicarboxylic acid component selected from the following 2-trimethyl-silylterephthalic acid of the following formula(II), 2,2-bistrimethyl-silyterephthalic acid of the following formula(III), 5-trimethylsilyl-isophthalic acid of the following formula(IV), dimethylphenylsilyl-isophthalic acid of the following formula(V), and triphenylsilylisophthalic acid of the following formula(VI), with an aromatic diamine component selected from the following p-phenylenediamine of the following formula(VII), m-phenylenediamine of the following formula(VIII), oxydianiline of the following formula(IX), and methylenedianiline of the following formula(X),

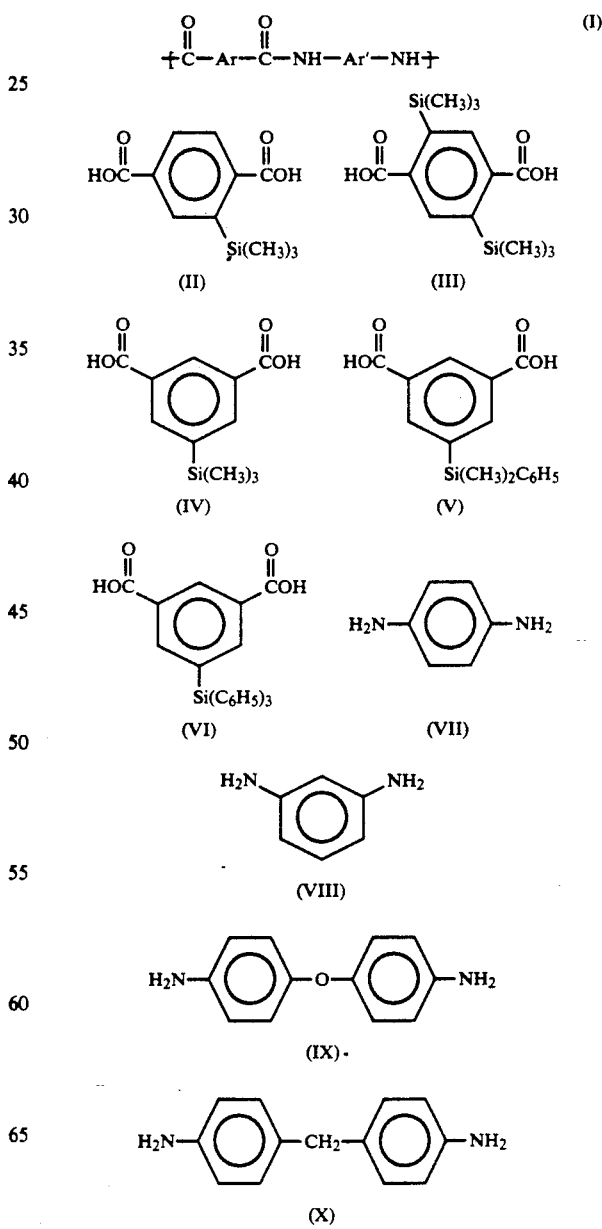

wherein,

—Ar— is (TSTA), (BTSTA), (TSIA), (DMSIA), (TPSIA)

—Ar'— is (PPDA), (MPDA), (OPA), (MPA)

6. The process as defined in claim 5, comprising, reacting at a temperature of 100°~120° C. with stirring.

* * * * *